United States Patent
Gorday et al.

(10) Patent No.: US 6,801,642 B2
(45) Date of Patent: Oct. 5, 2004

(54) METHOD AND APPARATUS FOR LIMITING STORAGE OR TRANSMISSION OF VISUAL INFORMATION

(75) Inventors: Robert Mark Gorday, Wellington, FL (US); Paul Edward Gorday, West Palm Beach, FL (US); Eric Thomas Eaton, Lake Worth, FL (US); Salvador Sibecas, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 35 days.

(21) Appl. No.: 10/185,985

(22) Filed: Jun. 26, 2002

(65) Prior Publication Data

US 2004/0001220 A1 Jan. 1, 2004

(51) Int. Cl.[7] .................................................. G06K 9/00
(52) U.S. Cl. ...................................... 382/118; 382/165
(58) Field of Search ................................ 382/118, 211, 382/203, 165; 705/26; 340/643; 235/487, 382; 348/239; 345/630, 441; 396/133; 359/763

(56) References Cited

U.S. PATENT DOCUMENTS

| | | | | |
|---|---|---|---|---|
| 5,452,047 A | * | 9/1995 | Fujii et al. .................. | 396/133 |
| 5,841,590 A | * | 11/1998 | Sato ............................ | 359/763 |
| 5,914,725 A | * | 6/1999 | MacInnis et al. ........... | 345/441 |
| 5,999,990 A | | 12/1999 | Sharrit et al. .................. | 710/8 |
| 6,028,960 A | * | 2/2000 | Graf et al. ................... | 382/203 |
| 6,394,356 B1 | * | 5/2002 | Zagami ....................... | 235/487 |
| 6,400,374 B2 | * | 6/2002 | Lanier ........................ | 345/630 |

FOREIGN PATENT DOCUMENTS

JP 404091585 A * 3/1992 ............ H04N/7/13

* cited by examiner

*Primary Examiner*—Anh Hong Do
(74) *Attorney, Agent, or Firm*—Randi L. Karpinia

(57) ABSTRACT

A method carried out at a transmitter (800), of limiting visual information that can be stored or transmitted captures a visual image (608). Whenever a control signal is detected (612) at the transmitter (800), at least a portion of the visual image is obscured (616) to produce an obscured visual image. This obscured image is then stored and/or transmitted (620). The image can be obscured by any number of techniques including replacement of the image with a substitute (718), blurring, distorting or reducing the resolution of the background (738), substitution of backgrounds (762) or removal of the background (778).

29 Claims, 4 Drawing Sheets

METHOD AND APPARATUS FOR LIMITING STORAGE OR TRANSMISSION OF VISUAL INFORMATION

FIELD OF THE INVENTION

This invention relates generally to the field of wireless video transmission devices and methods. More particularly, this invention relates to providing security for confidential information that can be captured by such wireless video transmission devices.

BACKGROUND OF THE INVENTION

Cellular telephones, PDAs (Personal Digital Assistants) and other portable electronic devices have become fixtures of everyday life over the last several years. As they evolve, prices continue to fall while the device's capabilities have expanded. Currently, such devices can be used in many places to make wireless connection to the Internet, play games as well as carry out email and other text messaging functions. It can readily be anticipated that as time goes by, the capabilities of such devices will continue to expand as prices continue to fall making use of such devices a permanent part of people's daily lives.

Wireless two-way communication products are emerging which will enable users to have portable live video and still image transmission capabilities. For example, cellular telephones and PDAs (personal digital assistants) are being developed with an integrated camera and display to provide video telephone calls and image capture. Similarly, digital cameras will likely be equipped with wireless transceivers, enabling them to transfer images to other devices for printing, storage, and sharing. Such capability is likely to become more prevalent in the future and it can reasonably be expected that the resolution of the images captured will be enhanced over time. It is also expected, due to memory constraints in portable devices, that still images will be captured then transmitted over wireless networks and the Internet for remote storage. This can lead to problems that will be described hereinafter.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
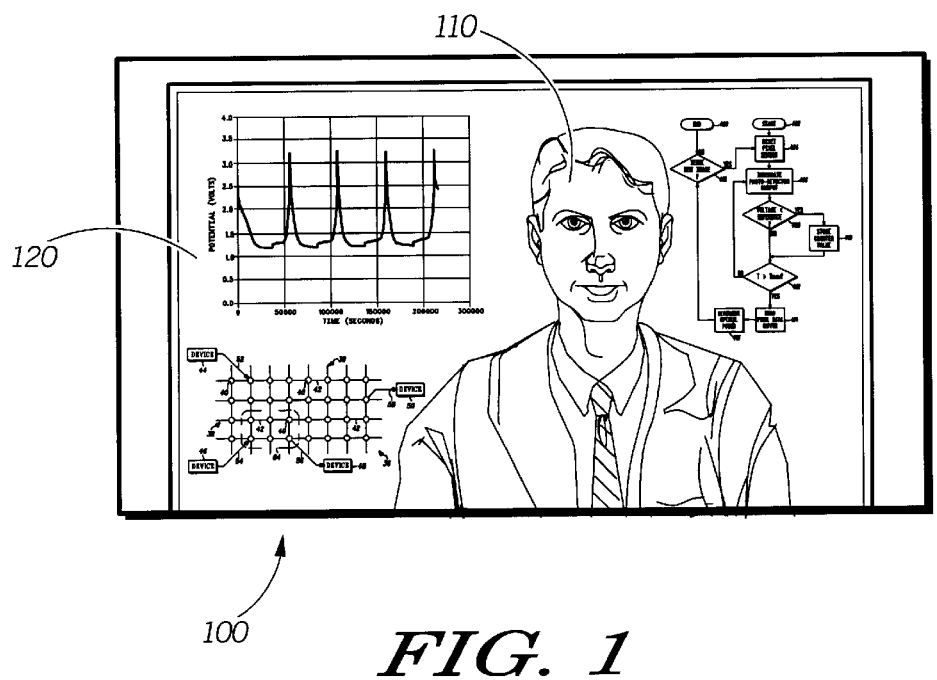
FIG. 1 illustrates a sample image that might be captured that contains confidential information.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding elements in the several views of the drawings.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

One problem with video/image recording capability in a cell phone or other wireless communication device is that it opens up the possibility of use of such devices for transmission of live images from locations where such images can contain protected information. Examples include work environments where cameras are not currently allowed, secure government and military facilities and sporting events where broadcast of images of the event are protected by licensing agreements to broadcast companies. Consider, for example, the image 100 illustrated in FIG. 1. This image depicts a person's face 110 against a background 120 that includes a marking board (a white board). If this image is taken inside a secure facility such as a corporate research facility, the marking board may contain information that is confidential to the corporation owning the research facility. Thus, the information could be accidentally or intentionally compromised by transmission of image 100 outside of the facility.

As video capable telephones and other communication devices become a commonplace belt worn or purse carried device for consumers, it may not always be acceptable to require that users remove these products in such secure locations, since the users depend on them for communications. This introduces the problem of how to protect the confidential, proprietary, sensitive or protected content of live images, while allowing large numbers of users to use their devices in these locations.

Figure 2:
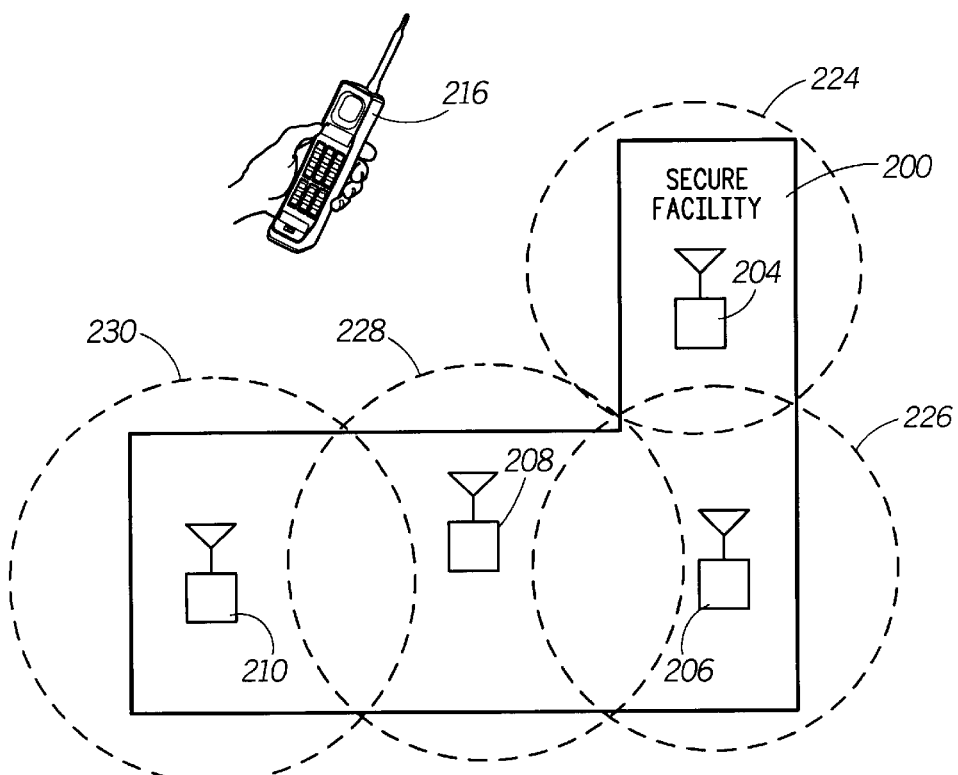
FIG. 2 is a diagram depicting a secure facility using a system for limiting storage or transmission of visual images consistent with certain embodiments of the present invention.

The present invention, in certain exemplary embodiments, addresses this problem by enabling control of the user device's image coding in specific user locations, for example via a wireless connection. This is illustrated in FIG. 2 in which a secure facility 200 incorporates a one or more transmitters such as 204, 206, 208 and 210 that operate to control the wireless device (e.g., a cell phone in the present example) to modify its image transmission ability. Whenever a device such as cellular telephone 216 enters designated locations that are protected by an envelope of transmissions from the wireless transmitters 204, 206, 208 and 210 (shown as dashed circles 224, 226, 228 and 230 representing the transmission range of transmitters 204, 206, 208 and 210 respectively), a wireless connection is established and used to control the device 216's image coding so that specific regions of the image (or entire image) are encoded with reduced quality (reduced Signal to Noise Ratio, reduced bits per pixel, added noise or distortion, etc.), or are omitted, or are substituted with alternate information. In short, at least a portion of the image is obscured to inhibit the transmission of confidential or proprietary information. This method allows the user to have limited use of the video/image communications facilities of device 216 while protecting a portion of the image content.

While this example uses wireless connections from transmitters 204, 206, 208 and 210, achieving this type of control in specific locations can be accomplished by any of a number of techniques including, but not limited to localized transmission of dedicated wireless control signals to the user devices (e.g. a beacon or network of beacons as described above); user device connection to a wireless network node (cell) or wireless LAN (Local Area Network) with dedicated signaling that controls image coding of all users connected to that network node; wireless network control of individual users' devices based on current user location information (Global Positioning System, etc.), location of user node (cell) connectivity, user ID, user profile, or combination of these.

Return of image coding control to the user device can be related to loss of wireless signal with control information, reception of wireless signal with control information that returns image coding control to the user device, change to new network node (cell), or detected change of location, and can incorporate timers to maintain control through short losses of control signal (e.g. device power off/on).

Several existing technologies can be used to implement the present invention in a manner consistent with certain embodiments, including, but not limited to: digital image coding methods that allow flexible control of which portions of an image are transmitted and corresponding image quality (e.g. JPEG (Joint Photographic Expert Group) with distortion rate control and region of interest coding, MPEG (Moving Pictures Expert Group) object-based coding), existing image processing algorithms for human face detection, user devices with image/video communications (image coding) capabilities, and capability to control the image coding of user image/video via wireless signaling.

Several possible techniques for implementing the image coding control include the following, and apply to 'still' or 'motion' image coding, but those skilled in the art will appreciate that other techniques can also be used:

1) Reduce image quality of the entire image (low SNR (signal to noise ratio), bits per pixel, etc), omit entire image, or substitute alternate image.
2) Use a human face detection algorithm such that the absence of a face of specific size results in reduced image quality of the image (low SNR, bits per pixel, etc), or omitting the image signal, or substituting an alternate image.
3) Use Region of Interest (ROI) image coding with human face detection algorithm such that the region(s) of the image around face(s) of specific size are coded with high resolution (high PSNR, bits per pixel, etc.) and remaining regions of image are coded with low resolution (low PSNR or bits per pixel, etc.). This provides a blurred or distorted background so that only the user's face is clear, protecting from transmitting background information. Other techniques can be used to blur or distort the background without departing from the present invention.

ROI image coding is part of the proposed JPEG2000 standard, and is accomplished by dividing the picture into 'tiles", where each tile is image coded separately. A face detection algorithm can identify tiles with portions of face, such that those tiles are coded with higher resolution.

4) In either 1-3, substitute images can be transmitted instead of the protected regions of the transmitted image. The alternate image can be, for example, a blank image, designated messages indicating the reason image is being limited, or even advertising.

Figure 3:
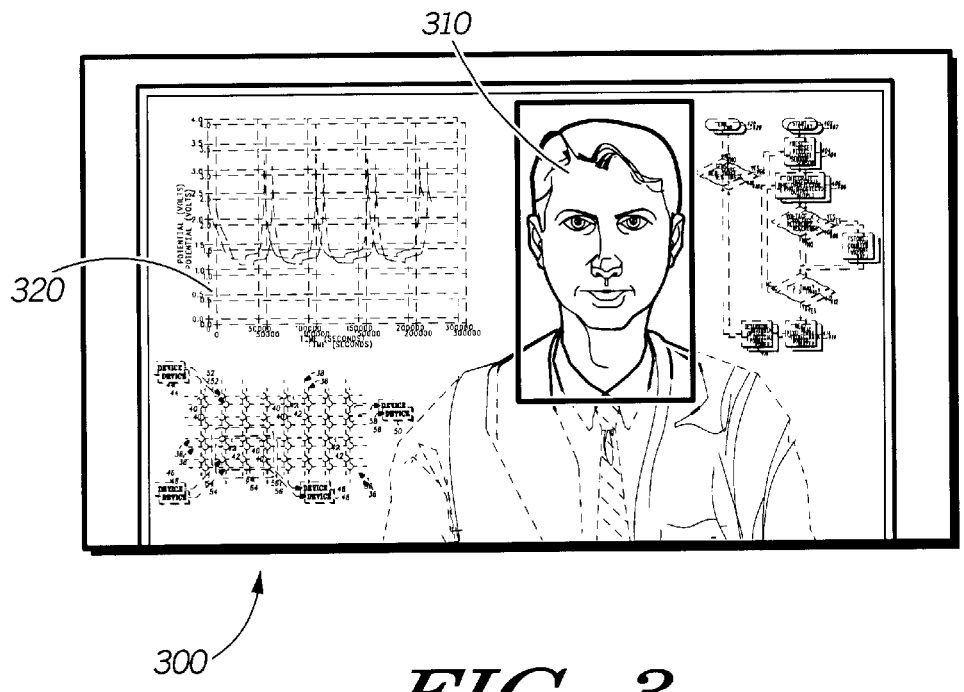
FIG. 3 depicts an image with a blurred background consistent with certain embodiments of the present invention.
Figure 4:
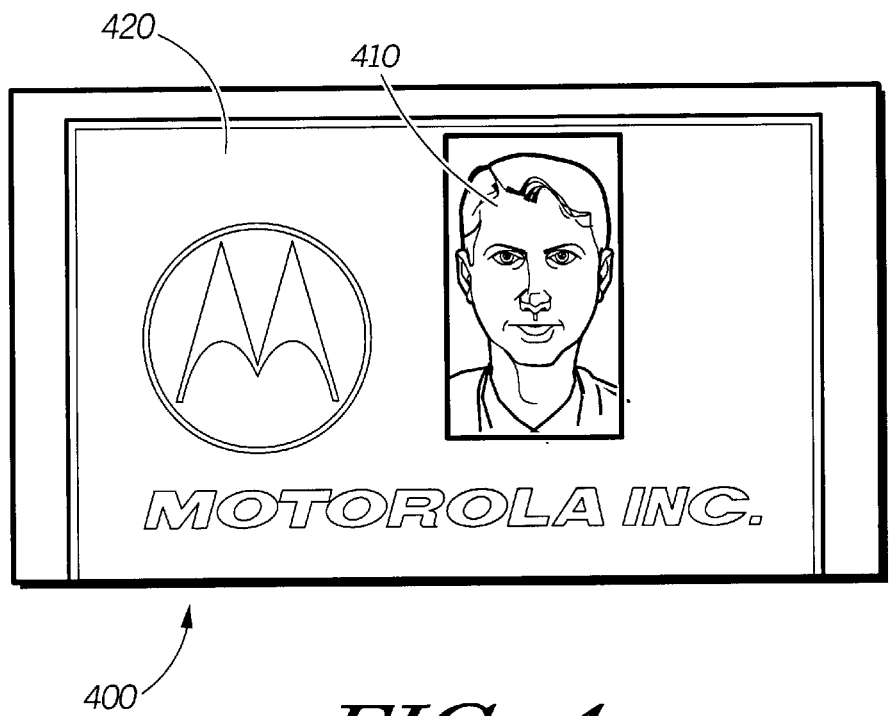
FIG. 4 depicts an image with a substitute background consistent with certain embodiments of the present invention.
Figure 5:
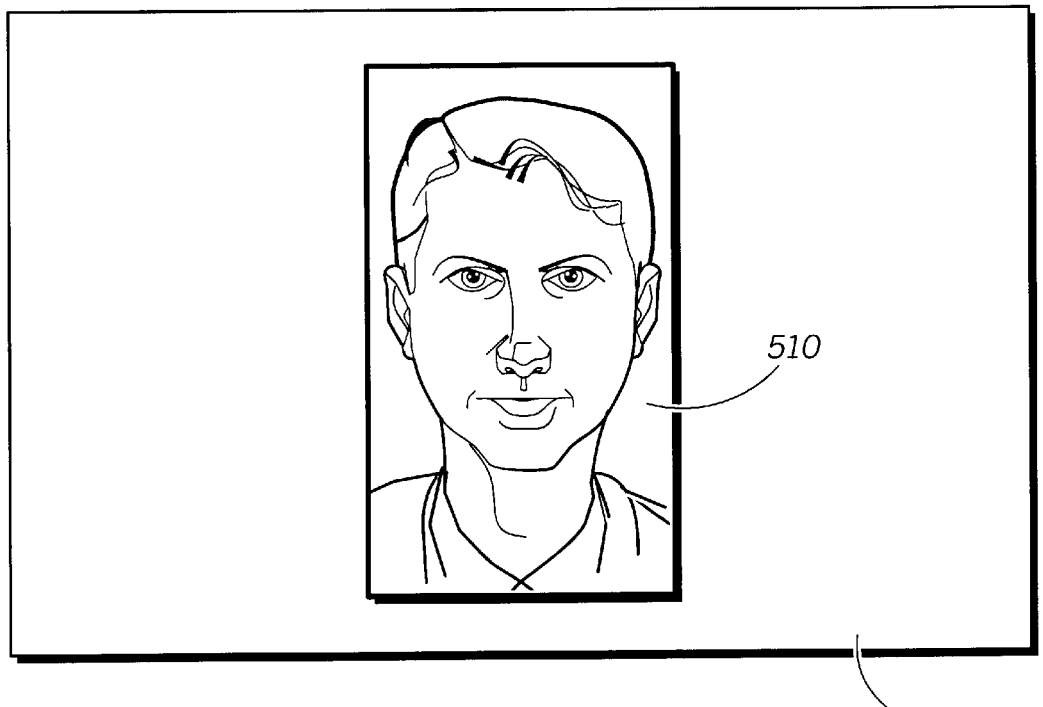
FIG. 5 depicts an enlarged image with a deleted background consistent with certain embodiments of the present invention.

FIGS. 3, 4 and 5 illustrate several possible ways of using ROI coding and image substitution mentioned above as applied to the original image 100 of FIG. 1. By way of example, the image shown in FIG. 3 can represent an image 300 coded with higher resolution for the face image 310 with the background 320 encoded with much lower resolution. For example, the face 310 could be coded with 8 bits per pixel, and the remainder of the image 320 coded with 2 bits per pixel with some omitted subbands. In order to carry out this processing, the image is first passed through a face detection algorithm (many such algorithms are currently known) and the higher resolution coding is applied (or retained) in the face image 310 while the remainder of the image 320 is recoded with much lower resolution to obscure all content except the face.

FIG. 4 illustrates a processed image wherein the face has been detected using a face detection algorithm producing face image 410. The background image has been completely removed and an advertisement 420 has been substituted for the background. Any suitable background image could be substituted including, but not limited to, messages, advertisements, a single or multiple color screen or any other suitable background.

FIG. 5 utilizes a detection algorithm to detect the face image and then enlarges the face image 510 to a size that is suitable to approximately fill the screen 520 of the wireless device in one direction. In this case, all background information is deleted.

In the examples shown, a rectangular segment containing the face image is segregated from other information that is deemed to be the background. However, this should not be considered limiting since algorithms exist that can detect the face outline itself and such algorithms could also be used. Moreover, other shapes can contain the face image in embodiments consistent with the present invention.

Figure 6:
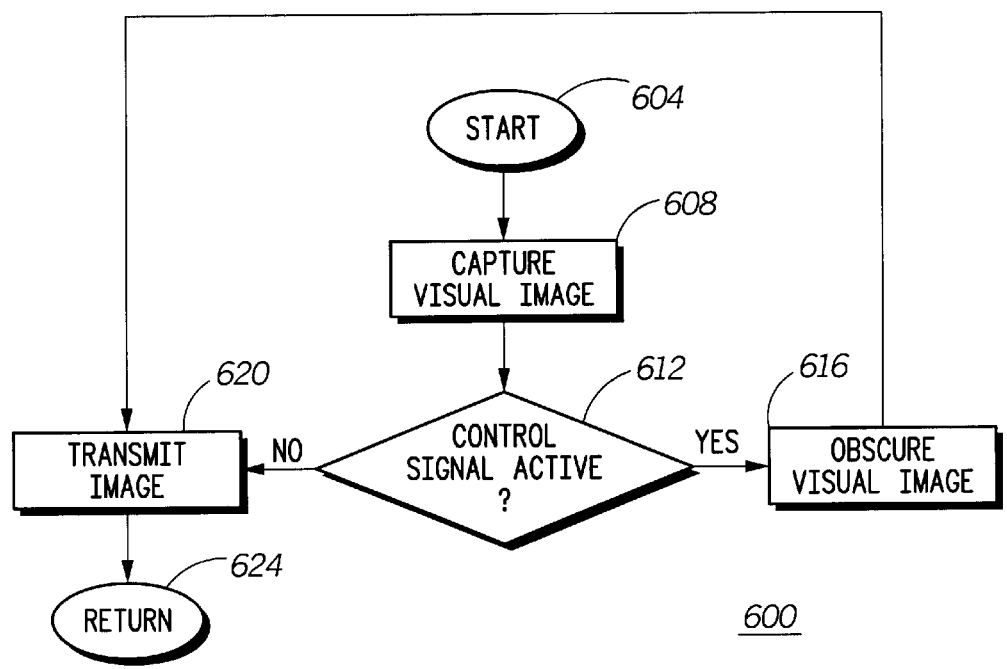
FIG. 6 is a flow chart of a process consistent with certain embodiments of the present invention.

The processes described above can be broadly depicted as shown in process 600 of FIG. 6 starting at 604. At 608, the camera forming a part of the wireless device (e.g., cellular telephone 216) captures a visual image (still or moving). If the device is actively receiving a control signal from a local transmitter (e.g., transmitters 204, 206, 208 or 210) at 612, then the image is processed to obscure it in some manner (e.g., remove or obscure background, delete image, replace image, etc.). The obscured image is then stored and/or transmitted at 620, and the process returns at 624. In the event no active control signal is present, the image is transmitted at 620 unobscured.

Thus, a method carried out at a user device, of limiting visual information that can be stored or transmitted, consistent with certain embodiments of the present invention involves capturing a visual image; detecting a control signal at the user device; responsive to the control signal, obscuring at least a portion of the visual image to produce an obscured visual image. The image can then be stored and/or transmitted.

Figure 7:
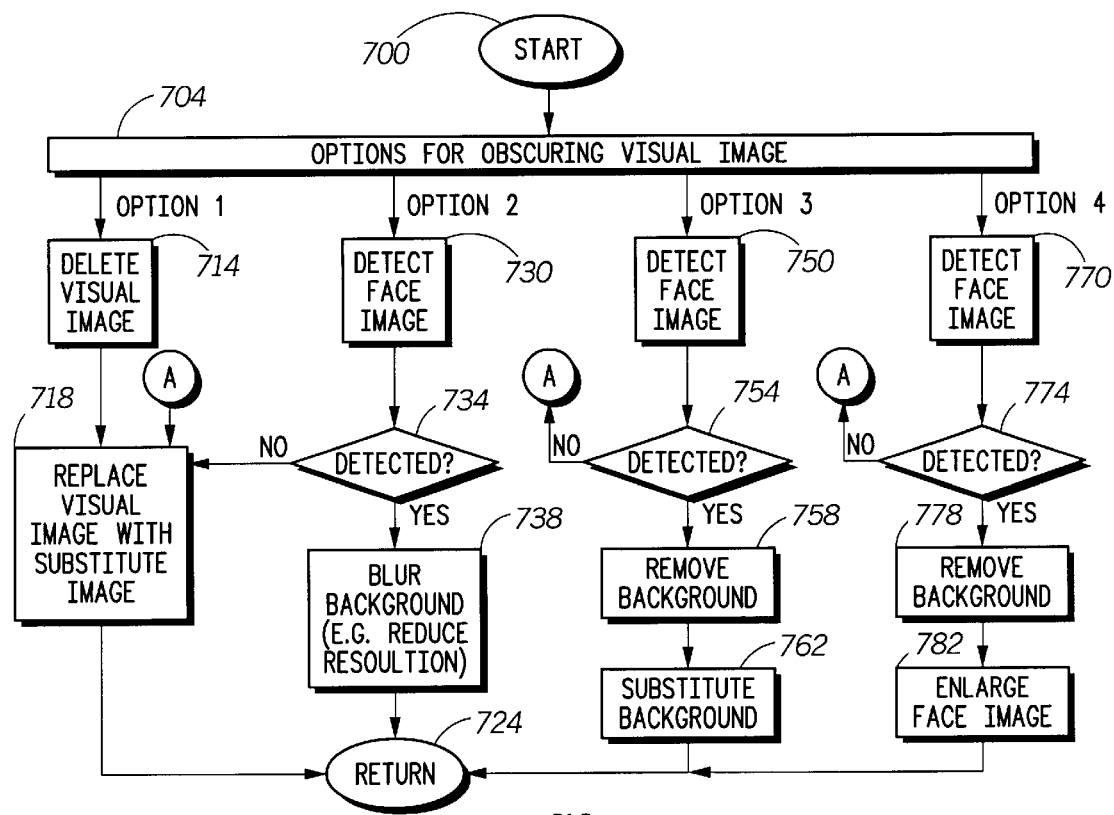
FIG. 7 is a flow chart of several methods for obscuring an image consistent with certain embodiments of the present invention.

Several of the techniques for obscuring the visual image as in 616 are depicted in flow chart 616 of FIG. 7 starting at 700. This flow chart depicts the process as one with several options shown as options 1 through 4. Such options could be implemented under control of the system imposing the restriction on video, the user or may simply represent several hypothetical options with only a single (or several) options actually being available. This flow chart is intended only to be illustrative of several of the options available and consistent with embodiments of the present invention and should not b bconsidered limiting. Options 704 can include, for example, option 1 wherein the entire visual image is deleted at 714 and replaced with a substitute visual image at 718 before returning at 724. The substitute visual image may be a blank screen, a colored screen, an advertisement, a message or any other suitable image.

In option 2, the image is first passed through a face detection algorithm at 730. If no face is detected at 734, control passes to 718 where a substitute image is provided. If a face is detected at 734, the background is isolated and blurred (e.g., by reduction of the resolution of blocks of information in the background) before returning at 724.

In option 3, the image is processed by a face detection algorithm at 750, and if no face is detected at 754, control passes to 718 where a substitute image is provided. If a face is detected at 754, the background is removed at 758 and a substitute background is inserted at 762 before returning at 724. The substitute background may be a blank screen, a colored screen, an advertisement, a message or any other suitable image.

In option 4, the image is processed by a face detection algorithm at 770, and if no face is detected at 774, control passes to 718 where a substitute image is provided. If a face is detected at 774, the background is removed at 778 and the face image alone is retained. In one embodiment consistent with the present invention, the face image is enlarged to approximately completely fill the screen of the wireless device at 782 before returning the image at 724.

Wireless control can be implemented via connection to a wireless network. The wireless network can include, for example, a large-scale cellular system, where specific cells or pico-cells could correspond to image-protected areas. Alternatively, a user may be able to use multiple wireless networks (e.g. a GSM (Global System for Mobile Communications) network and a Bluetooth® piconet), where one of the networks controls image coding for all transmissions on either network. Examples of these are included below, but it will be understood that these are illustrative examples and should not be considered limiting.

EXAMPLE 1

A sports arena installs a network of pico-cell base stations to support several wireless service providers such as those providing GSM and CDMA (Code Division Multiple Access) services. The range of the pico-cells is small (several hundred yards), so that the users in that arena are the only users of those pico-cells, and the users in that arena are forced by the service providers to use those base stations instead of the wide area cell. As a result, the service providers can then control all users in that arena to use one of the above techniques to allow users to make video calls, which include clarity for the human face, but not for a large scene of the sporting event. This service feature could cost very little to implement in software for the user device and network, and can be subsidized by the sporting event sponsor in order to protect its broadcast rights. Additionally, advertising revenue can be derived from the sale of advertisements for use in the regions that are being blurred or omitted from the visual image.

EXAMPLE 2

At a corporate research and development center, the entire facility could be covered with a short-range wireless network (e.g. wireless local area network) having piconet base stations inside the building. These piconets could be installed and coordinated such that users in the building are always within piconet coverage, while users some distance outside the facility are out of range of the wireless local area network (WLAN) coverage.

To be allowed in the building, a CDMA phone with image capture capability would be required to operate on the wireless LAN. Upon entry to the facility, the CDMA phone would automatically register with the wireless LAN, which then signals the device to control image coding of all captured images. Image coding is controlled for all captured images regardless of whether the image is stored on the device or used for transmissions on either the WLAN and on the CDMA network. As a result, all backgrounds behind people's faces (and bodies) could be blurred to prevent transmission of video images of facilities, prototype devices, meeting announcements, etc.

Figure 8:
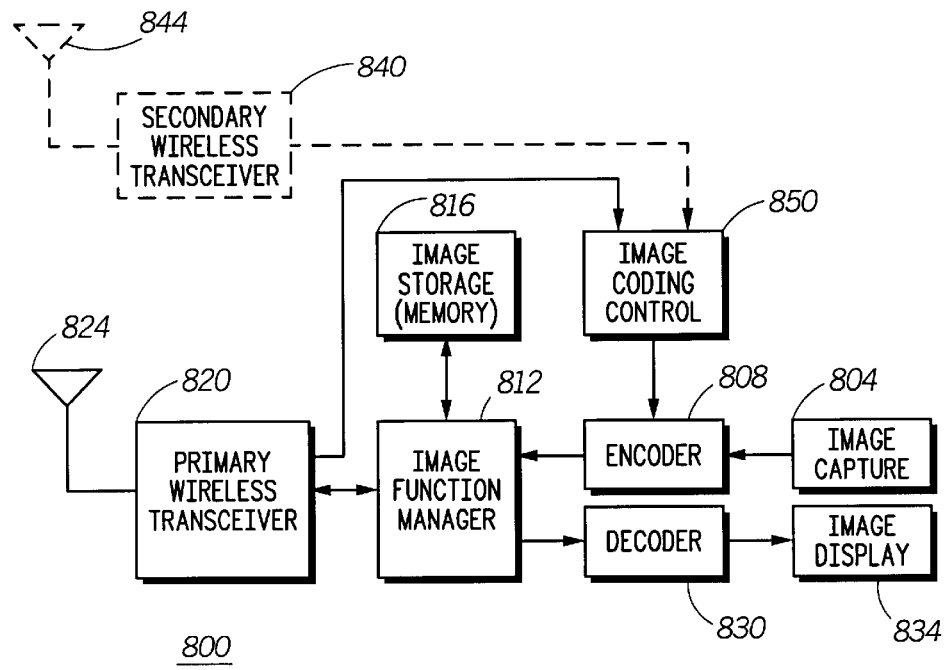
FIG. 8 is a block diagram of a wireless transmitting device consistent with certain embodiments of the present invention.

An exemplary wireless image capturing and transmitting device suitable for operating as described herein is depicted generally in FIG. 8 as device 800. Device 800 incorporates an image capture transducer element 804 such as a CCD (Charge Coupled Device) based video or still camera. The output of image capture transducer element 804 is passed to an encoder 808 that converts signals from the image capture transducer element 804 into digital form for storage or transmission. An image function manager 812 controls flow of image data from the encoder 808 to image storage memory (e.g., flash memory) 816 and to a primary wireless transceiver 820 for broadcast over antenna 824. Images received over the antenna 824 and transceiver 820 are also managed by image function manager 812 and passed either to image storage memory 816 or a decoder 830 (or both). Decoder 830 decodes the digital image format into a signal suitable for display on the device 800's image display 834.

A secondary wireless transceiver 840 and associated antenna 844 is used to receive control information that controls image coding and passes such information to an image coding control block 850. Image coding control block 850 adjusts the resolution and quality of the image encoding based upon receipt of control information from the secondary wireless transceiver 840. In another embodiment, the wireless secondary transceiver 840 and associated antenna 844 are not provided and the control information is received from the primary wireless transceiver. Other variations will occur to those skilled in the art upon consideration of the present disclosure.

Those skilled in the art will appreciate that many variations are possible within the scope of the present invention. For example, in the example above, the control over the capture, storage and transmission of images is based on the user's proximity to the control source transmitter(s). However, other parameters can be used to determine a user's rights to transmit visual information such as user location information, user connectivity to particular network or network node, assigned rights, user ID, user profile, etc., or some combination of these parameters. In certain variations, the method enables video/image capture and transmission from information-protected locations, where the wireless connection controls the image coding of recorded video/images for all wireless protocols and image storage formats supported by the user device. Where the above examples proposed certain methods to obscure the image, other methods can be used including, but not limited to, reduction of the image quality over the entire image, omission of the image, or replacing the image with an alternate image. In other embodiments where a human face detection algorithm is used, the absence of a face of specified size can result in the entire image having reduced image quality, or the image is omitted, or the image is replaced with an alternate image.

In other alternatives where a human face detection algorithm is used with Region of Interest (ROI) image coding, the region(s) of the image corresponding to face(s) (and possibly human body) are transmitted with high image quality and the remaining regions are transmitted with low image quality, or are omitted, or are replaced with other alternate image content. In another method consistent with the invention, a network service provider can receive un-modified video, then re-processes the user live video signal to achieve the desired image content protection.

While the above embodiments use receipt of a special wireless signal, in other embodiments, control of image coding of all captured images can also be accomplished by manual code entry into a user device with a keypad entry. In still other embodiments, for specific nodes in a wireless network, the user can be allowed to select an option to allow the system to control his image coding in order for the system to (1) optimize bandwidth and lower user cost (2) add advertising around image to lower user cost. Such image coding can be accomplished as described in this document.

Those skilled in the art will recognize that the present invention has been described in terms of exemplary embodiments that can be based upon use of programmed processors to implement functions such as those of encoder 808, decoder 830, image function manager 812 and/or image coding control 850. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented using any suitable electronic storage medium such as for example disc storage, Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention, as described in embodiments herein, is implemented using a programmed processor executing programming instructions that are broadly described above in flow chart form that can be stored on any suitable electronic storage medium (e.g., disc storage, optical storage, semiconductor storage, etc.) or transmitted over any suitable electronic communication medium. However, those skilled in the art will appreciate that the processes described above can be implemented in any number of variations and in many suitable programming languages without departing from the present invention. For example, the order of certain operations carried out can often be varied, additional operations can be added or operations can be deleted without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications, permutations and variations as fall within the scope of the appended claims.

What is claimed is:

1. A method carried out at a user transmitter device, of limiting visual information that can be stored or transmitted using the user transmitter device, comprising:

capturing a visual image, the visual image having a background portion;

detecting a control signal at the user device, the presence of said control signal being indicative that the user transmitter device is situated in a location in which imaging is restricted; and responsive to the user transmitter device detecting the control signal, obscuring at least the background portion of the visual image to produce an obscured visual image, so that at least the background portion of the visual information that can be stored or transmitted using the user transmitter device is obscured when the control signal is detected and not obscured otherwise.

2. The method according to claim 1, further comprising storing the obscured visual image.

3. The method according to claim 1, further comprising transmitting the obscured visual image.

4. A method according to claim 1, wherein the visual image comprises a still image.

5. The method in according to claim 1, wherein the visual image comprises a moving video image.

6. The method according to claim 1, wherein the obscuring comprises reducing resolution of at least a portion of the visual image to produce the obscured visual image.

7. The method according to claim 1, wherein the obscuring comprises reducing resolution of the background portion of the visual image to produce the obscured visual image.

8. The method according to claim 1, wherein the obscuring comprises one of blurring and distorting the background portion of the image.

9. The method according to claim 1, wherein the obscuring comprises:

detecting a face in the visual image; and reducing resolution of at least a portion of the visual image other than the face to produce the obscured visual image.

10. The method according to claim 1, wherein the obscuring comprises replacing at least a portion of the background portion of the visual image with a substitute image to produce the obscured visual image.

11. The method according to claim 10, wherein the substitute image includes an advertisement.

12. The method according to claim 1, wherein the obscuring comprises:
- detecting a face in the visual image; and
- blurring at least a portion of the visual image other than the face to produce the obscured visual image.

13. The method according to claim 1, wherein the obscuring comprises:
- detecting a face in the visual image; and
- distorting at least a portion of the visual image other than the face to produce the obscured visual image.

14. The method according to claim 1, wherein the obscuring comprises:
- attempting to detect a face in the visual image; and
- if a face is not detected, reducing resolution of the visual image to produce the obscured visual image.

15. The method according to claim 1, wherein the obscuring comprises:
- attempting to detect a face in the visual image; and
- if a face is not detected, obscuring the entire visual image to produce the obscured visual image.

16. The method according to claim 1, wherein the obscuring comprises:
- attempting to detect a face in the visual image; and
- if a face greater than a threshold size is not detected, obscuring the entire visual image to produce the obscured visual image.

17. The method according to claim 1, further comprising determining a user parameter, and wherein the obscuring is carried out if required by the user parameter.

18. The method according to claim 17, wherein the user parameter comprises at least one of a user location, user connectivity to particular network or network node, assigned rights, user ID and a user profile.

19. The method according to claim 1, wherein the control signal controls the image coding of images for all wireless protocols and image storage formats supported by the transmitter.

20. The method according to claim 3, further comprising detecting a human face in the visual image, and wherein a human face detection algorithm is used with Region of Interest (ROI) image coding; and further comprising transmitting the obscured visual image such that the region(s) of the image corresponding to a face is transmitted without being obscured.

21. The method according to claim 3, further comprising detecting a human face in the visual image, and wherein a human face detection algorithm is used with Region of Interest (ROI) image coding; and further comprising storing the obscured visual image such that the region(s) of the image corresponding to a face is stored without being obscured.

22. The method according to claim 1, further comprising transmitting the captured visual image to a network service provider, and wherein the obscuring is carried out by the network service provider.

23. The method according to claim 1, wherein the control signal comprises a wireless signal received at the transmitter.

24. The method according to claim 1, wherein the control signal comprises a manual code entry.

25. A method carried out at a device having a transmitter, of limiting visual information that can be stored or transmitted using the transmitter, comprising:
- capturing a visual image;
- detecting presence or absence of a control signal at the transmitter, the presence of said control signal being indicative that the device is situated in a location in which imaging is restricted;
- responsive to detecting the control signal, obscuring at least a portion of the visual image to produce an obscured visual image, so that visual information that can be stored or transmitted is obscured when the control signal is detected and not obscured otherwise; and
- transmitting the obscured visual image if the control signal is detected and transmitting an unobscured visual image if the control signal is not detected.

26. An apparatus for capture and storage or transmission of a visual image, comprising:
- an image capture transducer that captures a visual image;
- an encoder receiving an output of the image capture transducer;
- means for receiving a control signal that determines how a captured image is to be encoded, receipt of said control signal being indicative at least in part that the apparatus is situated in a location in which imaging is restricted; and
- an image coding control that controls the encoding of the visual image at the encoder based upon the control signal such that at least a portion of the image can be selectively obscured under control of the control signal, and wherein the image remains unobscured in the absence of the control signal.

27. The apparatus of claim 26, further comprising a memory for storing the image that is selectively obscured.

28. The apparatus of claim 26, further comprising a transmitter for transmitting the image that is selectively obscured.

29. The apparatus of claim 26, wherein the means for receiving comprises a receiver that receives a wireless transmission of the control signal.

\* \* \* \* \*